United States Patent [19]

Rehm

[11] Patent Number: 5,101,145
[45] Date of Patent: Mar. 31, 1992

[54] VELOCITY PROPORTIONAL INTEGRAL REGULATOR WITH NEGATIVE FEEDFORWARD TO CONTROL RESPONSE OF TORQUE DISTURBANCES

[75] Inventor: Thomas Rehm, Mequon, Wis.

[73] Assignee: Allen-Bradley Company, Inc., Milwaukee, Wis.

[21] Appl. No.: 649,391

[22] Filed: Feb. 1, 1991

[51] Int. Cl.$^5$ .............................................. H02P 7/00
[52] U.S. Cl. ..................................... 318/432; 318/609
[58] Field of Search ............... 318/609, 610, 615–619, 318/625, 628, 632, 431, 432, 434; 388/802, 806, 810, 902; 307/43, 66

[56] References Cited

U.S. PATENT DOCUMENTS

| | | | |
|---|---|---|---|
| 4,093,904 | 6/1978 | Burig et al. | 318/616 |
| 4,200,827 | 4/1980 | Oswald | 318/561 |
| 4,297,734 | 10/1981 | Laishley et al. | 360/78 |
| 4,623,827 | 11/1986 | Ito | 318/341 |
| 4,810,945 | 3/1989 | Yoneda et al. | 318/571 |
| 4,827,200 | 5/1989 | Ogura et al. | 318/561 |
| 4,845,418 | 7/1989 | Conner | 318/778 |
| 4,862,054 | 8/1989 | Schauder | 318/800 |
| 4,914,365 | 4/1990 | Murakami et al. | 318/609 |
| 4,947,336 | 8/1990 | Froyd | 364/474 |
| 5,017,800 | 5/1991 | Divan | 307/66 |

Primary Examiner—William M. Shoop, Jr.
Assistant Examiner—A. Jonathan Wysocki
Attorney, Agent, or Firm—Quarles & Brady

[57] ABSTRACT

A method and apparatus for control of one or more torque-regulated motors in a controlled system in which a feedforward velocity component is subtracted from an output of proportional-integral velocity regulator to soften the command response of the motor control, independent of torque disturbances reflected in the velocity feedback path. The velocity feedforward path is decoupled from the velocity feedback path. In a preferred embodiment, a digital-type motor controller is used to practice the method in controlling a paper processing line.

10 Claims, 2 Drawing Sheets

VELOCITY PROPORTIONAL INTEGRAL REGULATOR WITH NEGATIVE FEEDFORWARD TO CONTROL RESPONSE OF TORQUE DISTURBANCES

BACKGROUND OF THE INVENTION

1. Field of the Invention

The field of the invention is electronic motor drives for controlling speed and torque of an AC motor.

2. Description of the Background Art

Motor drives typically employ a velocity regulator in which proportional and integral functions are applied to an error signal and the results are summed to form an output. The error signal is an algebraic sum of inputs of position error or velocity reference and velocity feedback, and the resultant output is a torque command.

In one particular application of motor drives to motors on a paper processing line, a long web of material is wound over rollers at a certain tension. During tuning of the system for response to line transients, the change in position of a swing bar on a rolling member, known as a "dancer", may be considered to simulate a typical disturbance.

The general technical problem is the maintenance of overall line speed of the web feeding operation while smoothly damping out tension disturbances applied to the web.

The difficulty in applying prior approaches has been the coupling or interdependence of position and velocity feedback loops, which makes tuning of the control circuit very iterative and difficult.

Feedforward has been used for a variety of control purposes, but has traditionally been a factor that is added to regulator output signals.

SUMMARY OF THE INVENTION

In its broadest aspects, the invention relates to a method for providing a proportional feedforward factor from one input of a velocity regulator and subtracting the feedforward factor (negative feedforward) from the value of the torque command output from the velocity regulator such that the two proportional paths from velocity reference tend to cancel each other at the input to the torque controller. The velocity feedforward factor is decoupled from any velocity feedback and from any torque disturbance which is reflected in the velocity feedback.

The invention is practiced in a method for controlling an AC motor in a controlled system, including the steps of: 1) generating a velocity reference command; 2) comparing the velocity reference command and velocity feedback to produce a velocity error; 3) inputting the velocity error as an input to a proportional-integral velocity regulator; 4) applying a feedforward gain factor to the velocity reference command independent of the velocity feedback path to produce a velocity feedforward component that is independent of the velocity feedback path; and 5) subtracting the velocity feedforward component from an output from the proportional-integral velocity regulator to provide negative feedforward of the velocity reference command to control torque being applied to the AC motor in the controlled system.

In a more detailed aspect of the invention, the velocity reference command may represent position error developed from a position control loop.

In another more detailed aspect, the invention allows one or more inputs to a proportional-integral velocity regulator to be fed forward in the above described manner without affecting response to other inputs using the same regulator.

The invention can be practiced in a digital controller which is interfaced to a velocity-regulated motor with inner torque-regulated control.

Other objects and advantages, besides those discussed above, shall be apparent to those experienced in the art from the description of the preferred embodiment which follows. In the description, reference is made to the accompanying drawings, which form a part hereof, and which illustrate examples of the invention. Such examples, however, are not exhaustive of the various embodiments of the invention, and therefore reference is made to the claims which follow the description for determining the scope of the invention.

DETAILED DESCRIPTION OF THE PREFERRED EMBODIMENTS

Figure 1:
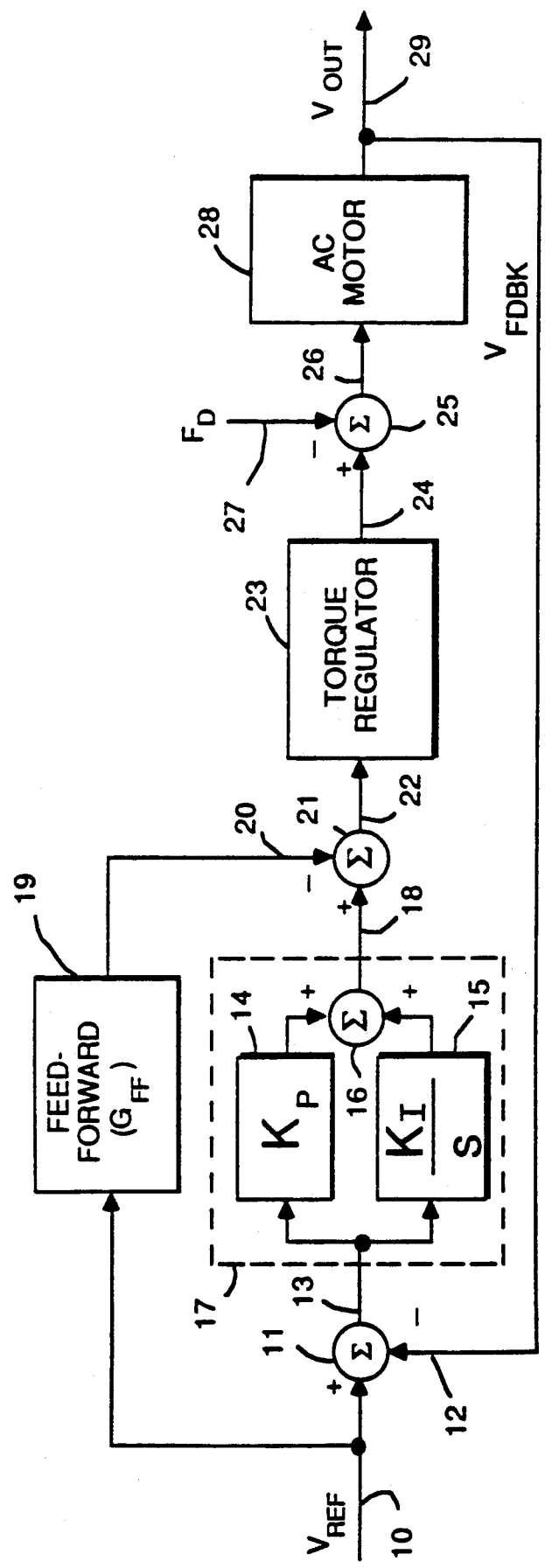
FIG. 1 is a block diagram of a basic motor control for carrying out the present invention.

Referring to FIG. 1, the method of the invention is illustrated in the form of a control diagram showing the operation of a digital controller in controlling an AC motor 28. A speed feedback device (not shown in FIG. 1) is coupled to an output of the motor 28, to provide a velocity feedback ($V_{FDBK}$) indicative of the output velocity ($V_{OUT}$) of the motor 28.

At the input to the motor control, a velocity reference command ($V_{REF}$) 10 is algebraically summed with velocity feedback ($V_{FDBK}$) 12 to generate a velocity error input 13 to a velocity regulator 17. In one branch of the regulator 17, a proportional gain factor ($K_P$), represented by block 14, is applied to the velocity error input 13. In a second, parallel branch, an integral gain factor ($K_I$) and an integral function represented by its Laplace transform (1/s), represented by block 15, are applied to the velocity error input. The two results are summed, as represented at summing junction 16 to a produce torque component 18 of torque command 22.

The velocity reference input ($V_{REF}$) 10 is also fed forward through feedforward gain block 19, where the $V_{REF}$ input is multiplied by feedforward gain ($G_{FF}$) to produce a torque adjustment factor 20. The torque adjustment factor 20 is algebraically summed with the torque component 18 to produce the torque command 22. In performing this summation, the torque adjustment factor 20 is of opposite polarity from the proportional branch component of the PI regulator 17 that is transmitted through signal path 10, 13, 14 and 18 to junction 21. This summation of the torque adjustment factor 20 tends to reduce the effect of the proportional branch component on the torque command 22.

The resultant adjusted torque command 22 then becomes an input to a torque regulator 23, which may again be a proportional-integral type regulator. The output 24 of the torque regulator 23 becomes a signal to drive AC motor 28. The torque output 24 from regulator 23 is effectively summed with any torque disturbance ($F_D$) 27 applied to the motor, as represented at summing junction 25. The resultant electromagnetic torque after the disturbance is input 26 to the motor 28.

A Laplace transform transfer equation for this system is therefore as follows:

$$V_{OUT}(s) = V_{REF}(s) \cdot \frac{[(1 - G_{FF}/K_p)(K_p s/J)] + K_I/J}{s^2 + K_p s/J + K_I/J} - F_D(s) \cdot \frac{s/J}{s^2 + K_p s/J + K_I/J} \quad (1)$$

where $K_P$ is the proportional gain factor,
$K_I$ is the integral gain factor,
J is the inertial constant for the motor, and
$G_{FF}$ is the feedforward gain factor.

The feedforward block provides a frequency-response "zero" in the numerator of the first term on the right side of the equation. The feedforward gain ($G_{FF}$) can be adjusted independently of tuning to reduce the effect of the disturbance torque ($F_D$) 27 on the speed of the system. In FIG. 1, it will be observed that the feedforward gain ($G_{FF}$) and feedforward path are not affected by, or connected to receive feedback ($V_{FDBK}$) from the feedback loop. Any torque disturbance is therefore isolated from the feedforward loop.

Figures 2, 3:
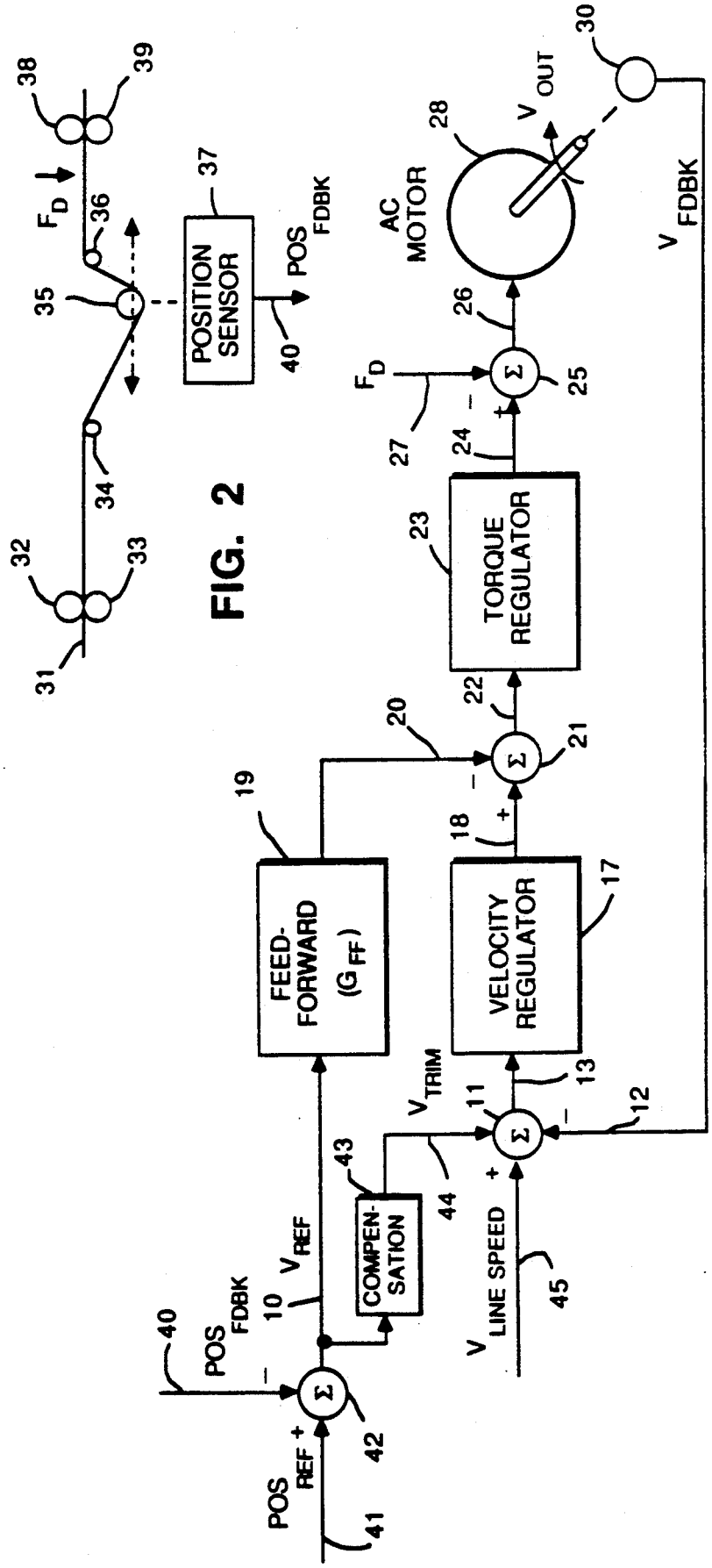
FIG. 2 is the best mode known for carrying out the invention.
FIG. 3 is a schematic diagram of the system being controlled by the motor control of FIG. 2.

The above method is applied to a paper processing operation, a portion of which is represented schematically in FIG. 2. A web of material 31 is fed through a first pair of calendar rolls 32, 33 which are driven by one AC motor (not shown). The web passes over auxiliary rollers 34 and 36 and around "dancer" roll 35, which is used to maintain proper tension on the web 31. The web 31 is then fed to a second pair of calendar rolls 38 and 39 which are driven by a second AC motor 28 shown in FIG. 3. In an actual paper processing operation there may be a plurality of cascaded stages with AC motors driving various rotating members, including a motor driving a reel for winding up the paper at the end of the line.

FIG. 3 shows a controller which uses the general method of FIG. 2, and includes the feedforward block 19, the proportional-integral velocity regulator 17 and the torque regulator as described above for FIG. 1. The same numbers have been used to identify elements in FIG. 3 that are also found in FIG. 1. FIG. 3 also shows a speed feedback device 30 which is coupled to an output shaft of the AC motor 28 to provide velocity feedback information ($V_{FDBK}$) for determining the actual rotational velocity of the motor 28.

As shown in FIG. 3, the velocity reference command ($V_{REF}$) of FIG. 1, may itself be an output from a position control loop in which a position reference command ($POS_{REF}$) and position feedback ($POS_{FDBK}$) are algebraically summed at junction 42 to provide a position error that becomes $V_{REF}$.

In this control application, position sensor 37 is coupled to a swing bar on the dancer roller 35 as represented by a vertical dashed line. The swing bar can move laterally as represented by the dashed double-arrow in FIG. 2. Movement of the swing bar occurs in response to transient operating forces on the web 31 and causes the position sensor 37 to transmit feedback signals 40. Position feedback ($POS_{FDBK}$) is transmitted from the position sensor 37 to a digital reference controller (elements 42, 43, and 19 in FIG. 3).

Within the digital reference controller, the position feedback 40 is summed with the position reference command 41 at junction 42. The resulting $V_{REF}$ command is then fed to two inputs, one on the feedforward gain block 19 and the other to an input to a compensation block 43. This compensation block 43 may include several derivative functions, but preferably includes at least one branch that applies only a proportional gain factor. After these functions are applied to input 10, it is referred to as a velocity trim ($V_{TRIM}$) input 44 to the velocity controller 17.

The velocity trim ($V_{TRIM}$) input 44 and the feedforward torque adjustment 20 input are preferably transmitted as serial data from the digital reference controller to a digital speed-torque regulator (elements 17 and 23).

Within this regulator, at junction 11, the velocity trim ($V_{TRIM}$) input 44 is summed with a line speed reference velocity ($V_{LINE\ SPEED}$) 45, and the negative velocity feedback ($V_{FDBK}$). The relative magnitude of the line speed reference velocity ($V_{LINE\ SPEED}$) is great compared to the other positive inputs, and its purpose is to keep all the motors in the paper processing line running at essentially the same speed, in the absence of transient disturbances. Finally, the feedforward torque adjustment 20 is subtracted from the torque command 18 at junction 21 to produce input 22 to torque regulator 23.

Before tuning the system, it is operated to obtain an operating mode that is generally satisfactory before final tuning adjustments are made. For tuning purposes, and to simulate transients on the paper line, a position change for the dancer 35 can be input as position feedback, or a disturbance torque ($F_D$) can applied to the web at a location near rollers 38 by the engagement of nip rolls (not shown) with the web 31.

The result of applying negative feedforward in the above described control method and apparatus is to decouple position error tension transients from line speed, while maintaining quick response to line speed commands and to disturbances. This is attributable to the negative feedforward control loop structure and its decoupling from the line disturbances.

FIG. 3 also shows the advantage of the invention in being applicable to one of a plurality of inputs ($V_{TRIM}$) without affecting the response to line speed reference velocity ($V_{LINE\ SPEED}$).

This description has been by way of example of how the invention can be carried out. Those with knowledge in the art will recognize that various details may be modified in arriving at other detailed embodiments, and that many of these embodiments will come within the scope of the invention. For example, although the invention has been described in connection with an AC motor, a motor control as described is also applicable to a DC motor. Therefore to apprise the public of the scope of the invention and the embodiments covered by the invention the following claims are made.

I claim:

1. A method for controlling a motor in which velocity feedback is transmitted through a velocity feedback path from a device coupled to the motor, the method comprising:

generating a velocity reference command;
comparing the velocity reference command and the velocity feedback to produce a velocity error;
inputting the velocity error as an input to a proportional-integral velocity regulator;

generating a proportional branch component and an integral branch component of a torque command output from the proportional-integral regulator;

applying a feedforward gain factor to the velocity reference command independent of the velocity feedback path to produce a proportional velocity feedforward component; and algebraically summing the velocity feedforward component and the torque command output from the proportional-integral velocity regulator, wherein the velocity feedforward component of velocity reference command is of opposite polarity from the proportional branch component that commands torque out of the velocity regulator.

2. The method of claim 1, wherein the step of generating the velocity reference command comprises:

receiving a position reference command;

receiving a position feedback command responsive to a change in position in the controlled system; and algebraically summing the position reference command with position feedback to produce the velocity reference command.

3. The method of claim 1, wherein the feedforward gain factor is applied to the velocity reference command and not to the velocity feedback.

4. The method of claim 3, wherein a compensation function is applied to the velocity reference command to produce a result that controls the velocity regulator.

5. The method of claim 3, further comprising summing a line reference velocity with the velocity reference and the velocity feedback independent of the velocity feedforward component in determining the velocity error input to the proportional-integral velocity regulator.

6. Apparatus for controlling an AC motor which drives equipment in a controlled system, in which velocity feedback is transmitted through a velocity feedback path from a device coupled to the AC motor, the apparatus comprising:

means for generating a velocity reference command;

means for comparing the velocity reference command and the velocity feedback to produce a velocity error;

a proportional-integral velocity regulator responsive to a velocity error input to produce a proportional branch component and an integral branch component of a torque command output;

means for inputting the velocity error as an input to the proportional-integral velocity regulator;

means for applying a feedforward gain factor to the velocity reference command independent of the velocity feedback path to produce a velocity feedforward component that is decoupled from the velocity feedback path; and means for algebraically summing the velocity feedforward component and the torque command output from the proportional-integral velocity regulator, wherein the velocity feedforward component of velocity reference command is of opposite polarity from the proportional branch component that commands torque out of the velocity regulator.

7. The apparatus of claim 6, wherein the means for generating the velocity reference command comprises:

means for receiving a position reference command;

means for receiving a position feedback command responsive to a change in position in the controlled system; and means for algebraically summing the position reference command with the position feedback command to produce the velocity reference command.

8. The apparatus of claim 6, wherein the feedforward gain factor is applied to the velocity reference command but not to the velocity feedback.

9. The apparatus of claim 8, further comprising means for applying compensation to the velocity reference command to produce a result, wherein this result is fed to the velocity regulator.

10. The apparatus of claim 8, wherein the means for inputting includes a second input for receiving a line reference velocity independent of the velocity feedforward component for driving a motor in the controlled system.

* * * * *